US012638548B2

(12) United States Patent　(10) Patent No.:　US 12,638,548 B2
Obayashi　(45) Date of Patent:　May 26, 2026

(54) SENSOR UNIT

(71) Applicant: DENSO CORPORATION, Kariya-city (JP)

(72) Inventor: Hironori Obayashi, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 382 days.

(21) Appl. No.: 18/188,288

(22) Filed: Mar. 22, 2023

(65) Prior Publication Data

US 2023/0221407 A1　Jul. 13, 2023

Related U.S. Application Data

(63) Continuation of application No. PCT/JP2021/032665, filed on Sep. 6, 2021.

(30) Foreign Application Priority Data

Oct. 9, 2020　(JP) ................................. 2020-171254

(51) Int. Cl.
*G01S 7/40*　(2006.01)
*B60S 1/54*　(2006.01)
*B60S 1/56*　(2006.01)
*G01S 7/02*　(2006.01)
*G01S 13/931*　(2020.01)

(52) U.S. Cl.
CPC .............. *G01S 7/4043* (2021.05); *B60S 1/54* (2013.01); *B60S 1/56* (2013.01); *G01S 7/028* (2021.05); *G01S 7/40* (2013.01); *G01S 13/931* (2013.01); *G01S 2013/9323* (2020.01); *G01S 2013/9324* (2020.01)

(58) Field of Classification Search
CPC .......... G01S 7/4043; G01S 7/028; G01S 7/40; G01S 13/931; G01S 2013/9323; G01S 2013/9324; B60S 1/54; B60S 1/56
USPC .......................................................... 73/431
See application file for complete search history.

(56) References Cited

U.S. PATENT DOCUMENTS

2019/0278078 A1* 9/2019 Krishnan ................ G01S 17/88
2020/0094788 A1* 3/2020 Takahashi ............. G01S 17/931
(Continued)

FOREIGN PATENT DOCUMENTS

JP　2000177483 A ＊ 6/2000
JP　2001-171491 A　6/2001
(Continued)

*Primary Examiner* — Stephanie E Bloss
*Assistant Examiner* — Kevin C Butler
(74) *Attorney, Agent, or Firm* — Precision Patents, P.C.

(57) ABSTRACT

A sensor unit for a vehicle includes an external sensor, a cleaning nozzle and a housing. The external sensor is configured to obtain information of an external environment, and to have a sensing area being set forward in a travel direction of the vehicle through an exposed surface exposed to the external environment. The cleaning nozzle has an injection port that is located in front of the exposed surface to inject a cleaning fluid to the exposed surface from above of the exposed surface in a yaw axis direction of the vehicle to clean the exposed surface. The housing is provided to hold the external sensor therein. The housing is configured to define a recess that is recessed toward a rearward in the travel direction from the exposed surface below the exposed surface in the yaw axis direction.

12 Claims, 6 Drawing Sheets

(56)         References Cited

U.S. PATENT DOCUMENTS

| | | | | |
|---|---|---|---|---|
| 2020/0307524 | A1 * | 10/2020 | Morita | B05B 1/323 |
| 2023/0221407 | A1 * | 7/2023 | Obayashi | B60S 1/54 |
| | | | | 73/431 |

FOREIGN PATENT DOCUMENTS

| | | | | | |
|---|---|---|---|---|---|
| JP | 2020049994 | A | * | 4/2020 | B60S 1/56 |
| JP | 2020157897 | A | * | 10/2020 | B60S 1/54 |
| JP | 2022087713 | A | * | 6/2022 | |
| JP | 7277198 | B2 | * | 5/2023 | B05B 1/267 |
| JP | 7459775 | B2 | * | 4/2024 | |

* cited by examiner

SENSOR UNIT

CROSS REFERENCE TO RELATED APPLICATION

The present application is a continuation application of International Patent Application No. PCT/JP2021/032665 filed on Sep. 6, 2021, which designated the U.S. and claims the benefit of priority from Japanese Patent Application No. 2020-171254 filed in Japan on Oct. 9, 2020. The entire disclosures of all of the above applications are incorporated herein by reference.

TECHNICAL FIELD

The present disclosure relates to a sensor unit.

BACKGROUND ART

A sensor unit in a vehicle is widely known, in which a sensing area of an external sensor that obtains information on an external environment is set through an exposed surface exposed to the external environment. In such a sensor unit, it is important to clean the exposed surface to which dirt easily adheres. For example, a glass surface of an in-vehicle camera, used as the exposed surface, is cleaned by blowing a compression air blown from a nozzle.

SUMMARY

According to an aspect of the present disclosure, a sensor unit for a vehicle includes an external sensor, a cleaning nozzle and a housing. The cleaning nozzle having an injection port is located in front of the exposed surface to inject a cleaning fluid to the exposed surface from above of the exposed surface in a yaw axis direction of the vehicle to clean the exposed surface. The housing is configured to hold the external sensor therein. The housing is configured to define a recess that is recessed toward a rearward in the travel direction from the exposed surface below the exposed surface in the yaw axis direction. In the sensor unit, the recess may be provided with a recessed surface that is inclined more rearward in the travel direction from the exposed surface as toward downward in the yaw axis direction. For example, the exposed surface may be inclined more rearward in the travel direction as toward downward in the yaw axis direction, and an inclination angle of the recessed surface inclined with respect to the yaw axis direction may be greater than an inclination angle of the exposed surface inclined with respect to the yaw axis direction.

BRIEF DESCRIPTION OF DRAWINGS

The above and other objects, features and advantages of the present disclosure will become more apparent from the following detailed description made with reference to the accompanying drawings. In the drawings.

DESCRIPTION OF EMBODIMENTS

Figure 1:
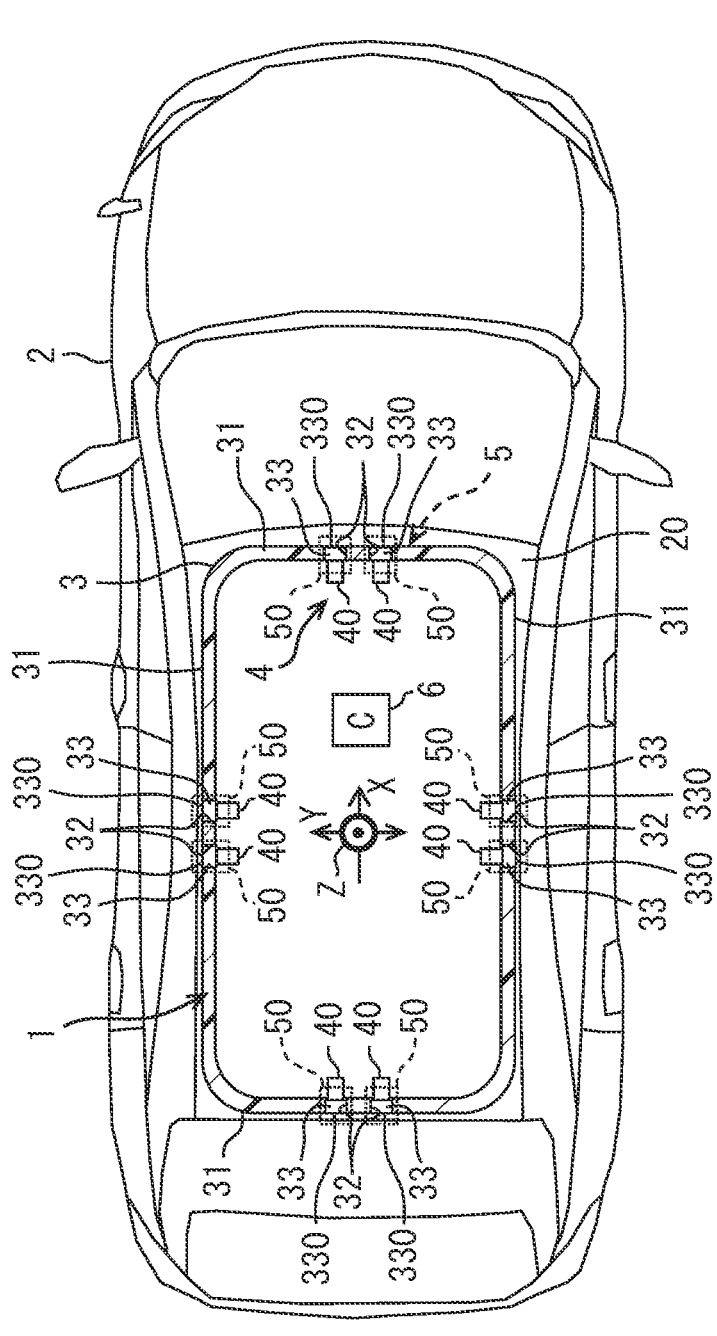
FIG. 1 is a horizontal cross-sectional view showing a mounting state of a sensor unit mounted to a vehicle, according to a first embodiment.

In an external sensor in which a sensing area is set toward a front side of a vehicle in a travel direction, a travel wind generated in the traveling of the vehicle and acting on an exposed surface blows a cleaning fluid away. Thus, a flow of the cleaning fluid may be disturbed depending on a structure around the exposed surface, and the cleaning performance on the exposed surface may be changed. In particular, in vehicles having an automatic driving control mode, variations in cleaning performance may affect a sensing performance, and an accuracy of an automatic driving control may be reduced.

It is an object of the present disclosure to provide a sensor unit that is configured to stabilize a cleaning performance on an exposed surface of an external sensor.

According to an exemplar of the present disclosure, a sensor unit for a vehicle includes an external sensor, a cleaning nozzle and a housing. The external sensor is configured to obtain information of an external environment, and to have a sensing area of the vehicle through an exposed surface exposed to the external environment. The cleaning nozzle having an injection port is located to inject a cleaning fluid to the exposed surface from above of the exposed surface in a yaw axis direction of the vehicle to clean the exposed surface. The housing is configured to hold external sensor therein and has a wall portion positioned at an outside. The housing is provided with the exposed surface and an inclination wall surface extending from the exposed surface below the exposed surface, and the exposed surface and the inclination wall surface are provided as a part of the wall portion of the housing. In addition, the inclination wall surface and the exposed surface are respectively inclined with respect to the yaw axis direction to be positioned more inside as toward downward in the yaw axis direction, and an inclination angle of the inclination wall surface inclined with respect to the yaw axis direction is greater than an inclination angle of the exposed surface inclined with respect to the yaw axis direction. Thus, the cleaning fluid can flow smoothly on the exposed surface For example, the wall portion of the housing is a front wall positioned at a front side of the vehicle. In this case, the cleaning fluid is injected from above and from the front toward the exposed surface on which the travel wind acts while the vehicle is traveling. Even in this situation, the cleaning fluid flows rearward into a recess defined by the inclination wall surface when flowing down the exposed surface, thereby making it difficult for the flow of the cleaning fluid to be disturbed. As a result, the cleaning fluid can flow smoothly on the exposed surface, so that the cleaning performance for the exposed surface can be stabilized.

Hereinafter, embodiments are described with reference to the drawings. In the following description, the same reference symbols are assigned to corresponding components in each embodiment in order to avoid repetitive descriptions. When only a part of the configuration is described in the respective embodiments, the configuration of the other embodiments described before may be applied to other parts of the configuration. Further, not only the combinations of the configurations explicitly shown in the description of the respective embodiments, but also the configurations of the plurality of embodiments can be partially combined together even if the configurations are not explicitly shown if there is no problem in the combination in particular.

First Embodiment

As shown in FIG. 1, a sensor unit 1 of the first embodiment is mounted on a vehicle 2. The vehicle 2 is capable of performing a continuous or temporary automatic driving in an automatic driving control mode. Here, the automatic driving control mode may be realized by automatic driving control, such as a conditional driving automation, an advanced driving automation, or a full driving automation, in which the system when being activated performs all driving tasks. The automatic driving control mode may be realized with an advanced driving assistance control, such as driving assistance or partial driving automation, where an occupant performs some or all driving tasks. The automatic driving control mode may be realized by combining or switching between the automatic driving control and the advanced driving assistance control.

First, the basic structure of the sensor unit 1 according to the first embodiment will be described. The sensor unit 1 includes a housing 3, a sensor system 4, a cleaning system 5 and a control system 6. Hereinafter, the description regarding the direction of the sensor unit 1 is based on the position of the vehicle 2 on the horizontal plane. Here, the vehicle 2 has, by definition, a travel direction X, which is a vehicle front-rear direction as a roll axis direction, a pitch axis direction Y (i.e., vehicle width direction) and a yaw axis direction Z (i.e., vehicle up-down direction). Under such definition, in particular, the front and rear of the travel direction X may be fixed regardless of the switching of the same direction X, or may be reversed according to the switching of the same direction X.

The housing 3 is made of, for example, resin, metal, or a combination thereof, and has a hollow flat-rectangular box shape. The housing 3 is installed at a roof 20 of the vehicle 2. The housing 3 has outer wall portions 31 erected along the four sides of the roof 20 on the front and rear sides in the travel direction X and on the left and right sides in the pitch axis direction Y, respectively. A plurality of sensor windows 32 are opened in each of the outer wall portions 31. Each sensor window 32 is covered with a plate-like transparent cover 33. An outer surface of each transparent cover 33 constitutes an exposed surface 330 exposed to the outside of the vehicle 2.

The sensor system 4 has a plurality of external sensors 40. Each of the external sensors 40 is held inside the housing 3 so as to individually correspond to a plurality of sets of sensor windows 32 and transparent covers 33. Each of the external sensors 40 is made of one type of, for example, a camera, a LiDAR (Light Detection and Ranging/Laser Imaging Detection and Ranging), a radar, a sonar, or the like.

Figure 2:
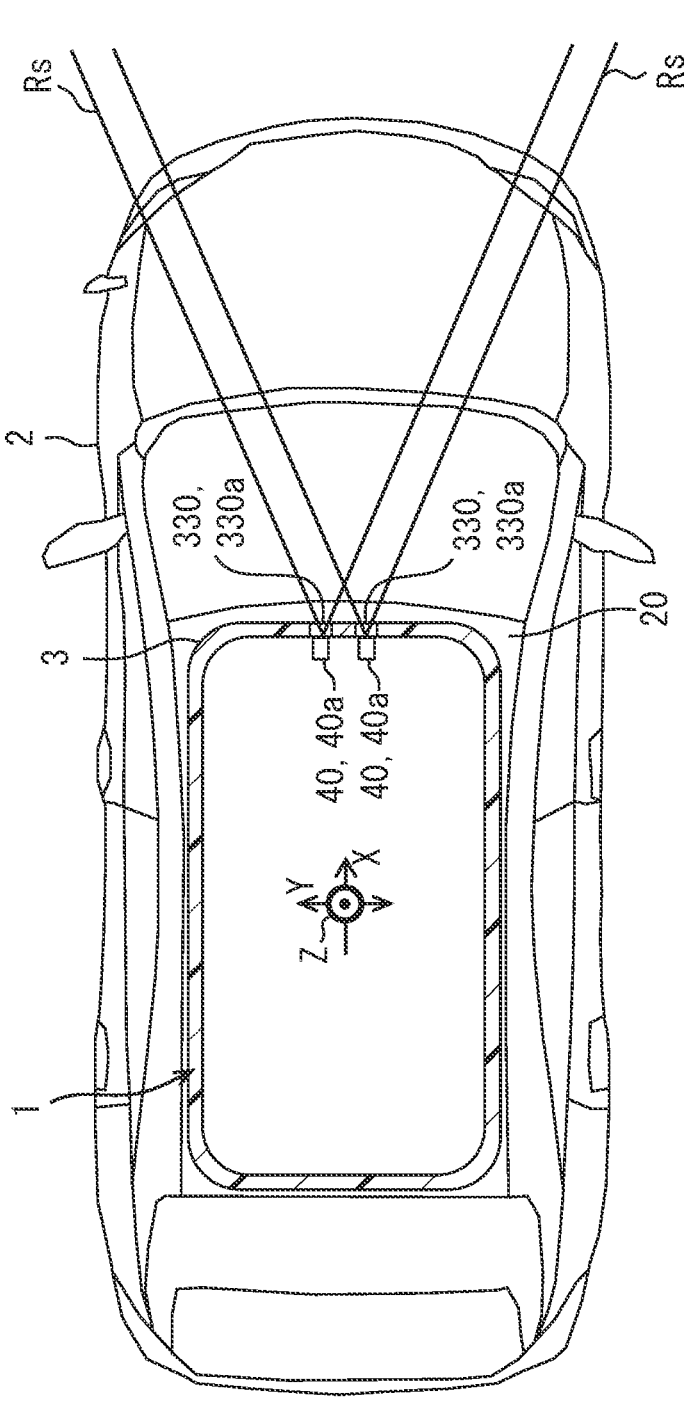
FIG. 2 is a horizontal cross-sectional view for explaining characteristics of the sensor unit according to the first embodiment.

Assuming that type is distinguished here including differences in structure, at least two of the external sensors 40 may be of the same type, or all of the external sensors 40 may be of different types. Each of the external sensors 40 has a sensing area Rs for sensing the external environment of the vehicle 2 through the exposed surface 330 of the corresponding transparent cover 33, as shown in FIG. 2. Each of the external sensors 40 obtains information on an object existing in the sensing area Rs as sensing information. In FIG. 2, a diagram representatively shows an example of the external sensor 40a in which the sensing area Rs is set forward in the travel direction X through the exposed surface 330a facing forward.

Figure 3:
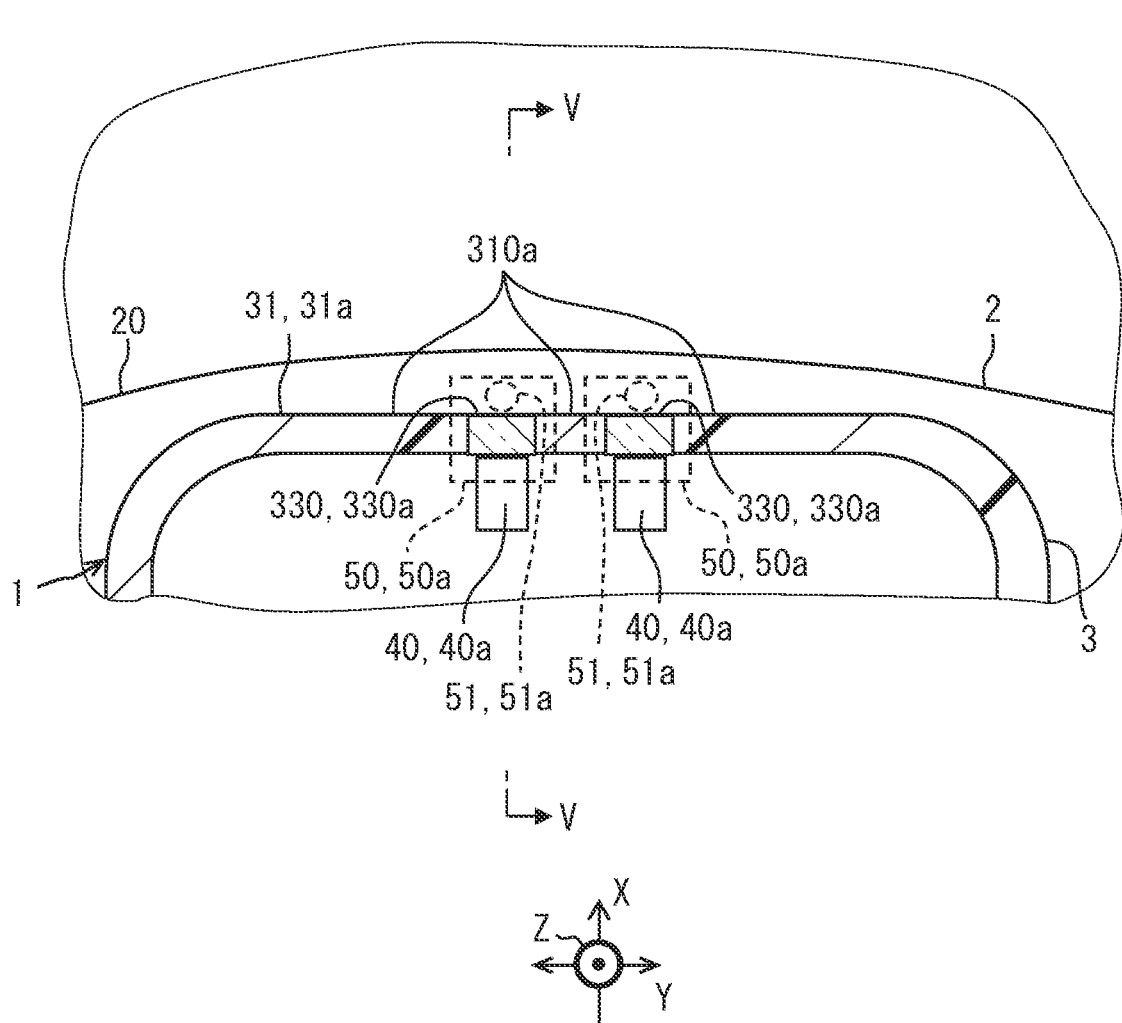
FIG. 3 is a horizontal cross-sectional view showing a detailed structure of the sensor unit according to the first embodiment.
Figure 4:
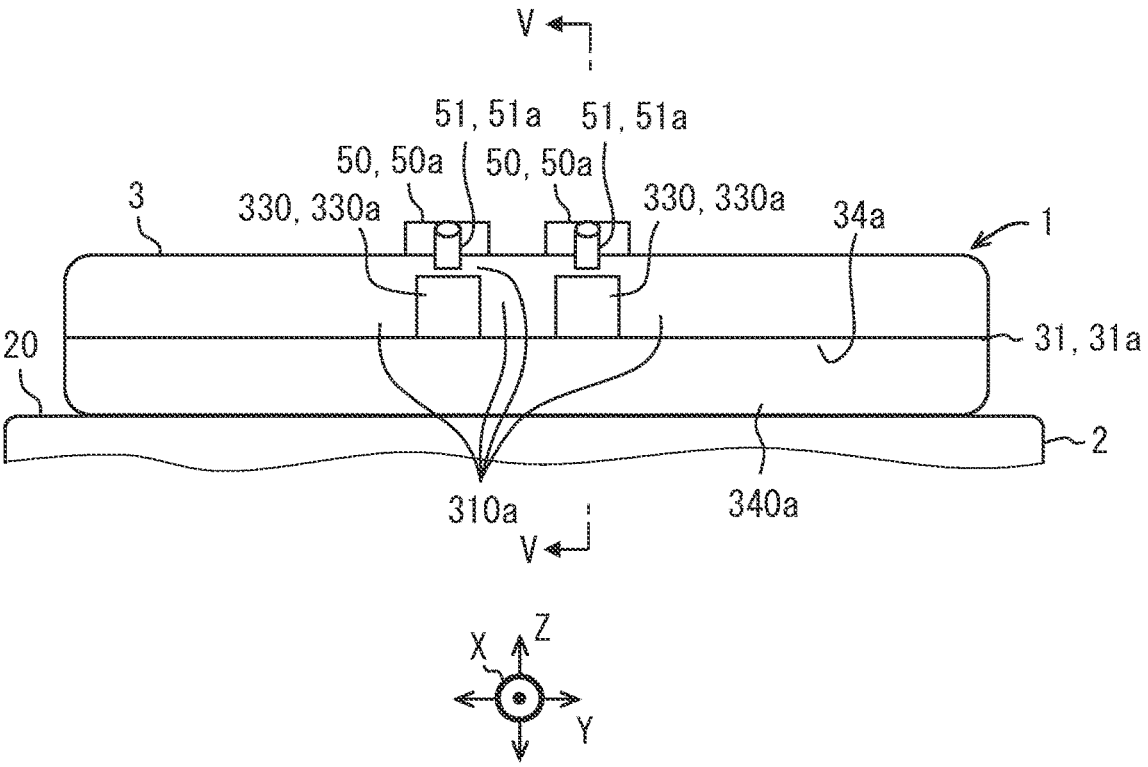
FIG. 4 is a front view showing a detailed structure of the sensor unit according to the first embodiment.
Figure 5:
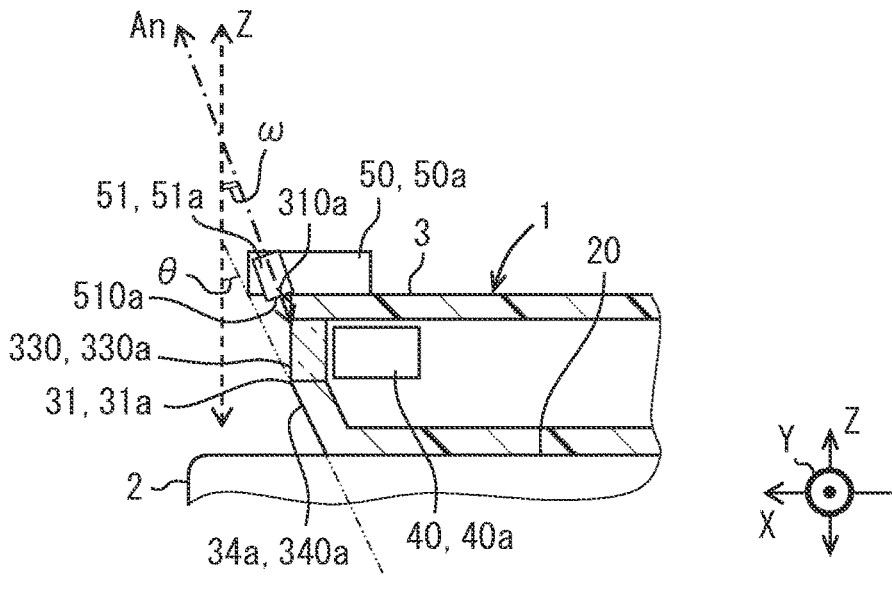
FIG. 5 is a vertical cross-sectional view showing a detailed structure of the sensor unit according to the first embodiment, and is a vertical cross-sectional view taken along a line V-V of FIGS. 3 and 4.

As shown in FIG. 1, the cleaning system 5 includes multiple cleaning modules 50. Each of the cleaning modules 50 is held across the inside and outside of the housing 3 so as to individually correspond to the plurality of sets of the sensor window 32 and the transparent cover 33. Accordingly, each of the cleaning modules 50 also corresponds to an individual external sensor 40. Each of the cleaning modules 50 cleans the exposed surface 330 positioned in the sensing area Rs of the corresponding external sensor 40. As shown in FIGS. 3 to 5, each of the cleaning modules 50 has at least one cleaning nozzle 51 for injecting a cleaning fluid toward the exposed surface 330 to be cleaned. Here, the cleaning fluid injected from the cleaning nozzle 51 in each of the cleaning modules 50 may be, for example, a cleaning gas such as air, or may be a cleaning liquid. Further, each of the cleaning modules 50 may have at least one cleaning wiper for wiping the exposed surface 330 to be cleaned, in addition to the cleaning nozzles 51. FIGS. 3 to 5 representatively show an example of the cleaning module 50a corresponding to the external sensor 40a for front direction as described above.

The control system 6 is held inside the housing 3 shown in FIG. 2. The control system 6 is mainly made of at least one dedicated computer. The control system 6 is connected to the sensor system 4 and the cleaning system 5 of the sensor unit 1 and the control systems inside the vehicle 2 via at least one of LAN (Local Area Network), covered wiring, wire harness, internal bus, and the like. The control system 6 controls the operation of at least the cleaning nozzle 51 in the cleaning system 5 based on sensing information from at least the external sensor 40 in the sensor system 4. The control system 6 realizes the control mode including the automatic driving control mode in cooperation with the control system inside the vehicle 2, based at least on the sensing information of the external sensor 40 in the sensor system 4.

(Detailed Structure)

Next, detailed structures of the housing 3 and the cleaning nozzle 51 according to the first embodiment will be described with reference to FIGS. 3 to 5. In addition, in the explanation of the detailed structure, it is assumed that the front and rear in the travel direction X of the vehicle 2 are fixed regardless of the switching on the same direction X of the vehicle 2.

As shown in FIGS. 3 to 5, the housing 3 is configured to accommodate a plurality of external sensors 40a each having the sensing area Rs set forward in the travel direction X through the exposed surface 330a facing forward in the travel direction X. The exposed surfaces 330a respectively corresponding to the front external sensors 40a are exposed to the front external environment in the travel direction X from a front outer wall portion 31a of the housing 3, as shown in FIGS. 3 to 5. The front outer wall portion 31a of the housing 3 forms a vertical wall surface 310a, which surrounds adjacently to two sides of the exposed surface 330a in the pitch axis direction Y and is adjacent to the above of the exposed surface 330a in the yaw axis direction Z. The exposed surface 330a and the vertical wall surface 310a are planar surface, substantially flat, and are substantially perpendicular to the travel direction X.

As shown in FIGS. 4 and 5, the front outer wall portion 31a of the housing 3 forms a recess 34a at a position continuously below each of the exposed surfaces 330a in the yaw axis direction Z. The recess 34a extends below the vertical wall surface 310a in the yaw axis direction Z, so that the recess 34a extends in the pitch axis direction Y, over a lower portion of each of the exposed surfaces 330a and a lower portion of the vertical wall surface 310a. The recess 34a is provided with a recessed surface 340a in the shape of an inclined plane that is inclined rearward in the travel direction X as toward downward in the yaw axis direction Z from each of the exposed surfaces 330a. An angle θ formed by the recessed surface 340a rearward in the travel direction X with respect to the yaw axis direction Z is set to an acute angle range larger than 0 degree as shown in FIG. 5. Due to the formation of the recessed surface 340a, the recess 34a is recessed rearward in the travel direction X from each of the exposed surfaces 330a. In particular, because of the formation of the inclined planar recessed surface 340a, the recess 34a opens forward in the travel direction X, while it is covered with the roof 20 of the vehicle 2 in the yaw axis direction Z from below.

As shown in FIGS. 3 to 5, the front outer wall portion 31a of the housing 3 holds a plurality of cleaning nozzles 51a corresponding to the respective exposed surfaces 330a exposed forward in the travel direction X. Each of the cleaning nozzles 51a is formed with at least one injection port 510a for injecting a cleaning fluid toward the corresponding exposed surface 330a from above in the yaw axis direction Z, in order to clean the corresponding exposed surface 330a. The injection port 510a of each of the cleaning nozzles 51a is arranged forward in the travel direction X from the corresponding exposed surface 330a to be cleaned. The central axis direction of each of the cylindrical cleaning nozzles 51a is defined as an injection axis direction An. For example, in a configuration where each of the cleaning nozzles 51a is provided with a single injection port 510a, the central axis direction of the injection port 510a may substantially coincides with the injection axis direction An.

As shown in FIG. 5, the injection axis direction An of each of the cleaning nozzles 51a is inclined rearward in the travel direction X toward the corresponding exposed surface 330a to be cleaned, that is positioned lower of the cleaning nozzle 51a in the yaw axis direction Z. Here, the injection axis direction An can be adjusted by, for example, a mounting angle of each of the cleaning nozzles 51a attached to the front outer wall portion 31a. For example, in the first embodiment, an angle ω formed by the injection axis direction An to the rear in the travel direction X with respect to the yaw axis direction Z is set to be within an acute angle range, which is an angle range smaller than the angle θ formed by the inclined planar recessed surface 340a to the rear in the travel direction X with respect to the yaw axis direction Z.

Operation Effects

The operation and effects of the first embodiment described above are described below.

Figure 6:
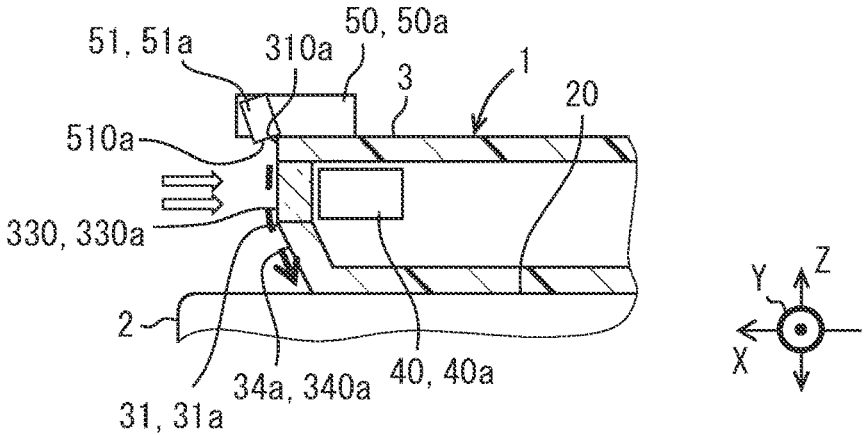
FIG. 6 is a vertical cross-sectional view for explaining effects of the sensor unit according to the first embodiment.

According to the first embodiment, the sensing area Rs of the external sensor 40a in the vehicle 2 is set forward in the travel direction X through the exposed surface 330a. Here, in order to clean the exposed surface 330a, the cleaning nozzle 51a is arranged such that the injection port 510a for injecting cleaning fluid from above in the yaw axis direction Z toward the exposed surface 330a in the vehicle 2 is formed at a forward position in the travel direction X than the exposed surface 330a. The housing 3 that holds the external sensor 40a therein has the recess 34a that is recessed toward the rearward in the travel direction X from the exposed surface 330a at a position below the exposed surface 330a in the yaw axis direction Z. According to the above, the cleaning fluid, which is injected from above and from the front toward the exposed surface 330a on which the travel wind acts while the vehicle 2 is traveling, flows downward from the exposed surface 330a by flowing rearward into the recess 34a as indicated by a dashed arrow as shown in FIG. 6, and thereby the flow of the cleaning fluid is less likely to be disturbed. As a result, the cleaning fluid can flow smoothly on the exposed surface 330a, so that the cleaning performance for cleaning the exposed surface 330a can be stabilized.

According to the first embodiment, in the recess 34a, because the recessed surface 340a is inclined rearward in the travel direction X as toward downward in the yaw axis direction Z from the exposed surface 330a, the cleaning fluid flowing from the exposed surface 330a is guided downwardly and in rearward along the recessed surface 340a, thereby making it difficult for the cleaning fluid to have a vortex. This makes it easier for the cleaning fluid to flow smoothly on the exposed surface 330a, and it is possible to improve the stability of the cleaning performance.

According to the first embodiment, when the cleaning fluid is a cleaning gas, it can flow smoothly on the exposed surface 330a according to the principle described above, thereby the cleaning gas can blow liquid matter such as rain, which tends to stain the exposed surface 330a, into the recess 34a. Therefore, it is possible to enhance the stable cleaning performance itself.

According to the first embodiment, the sensing area Rs of the external sensor 40a of the vehicle 2 in the automatic driving control mode is set forward through the exposed surface 330a. In the first embodiment, by stabilizing the cleaning performance for the exposed surface 330a according to the above-described principle, the sensing performance of the external sensor 40a is also stabilized, and the precision of automatic driving control is improvable.

Figure 7:
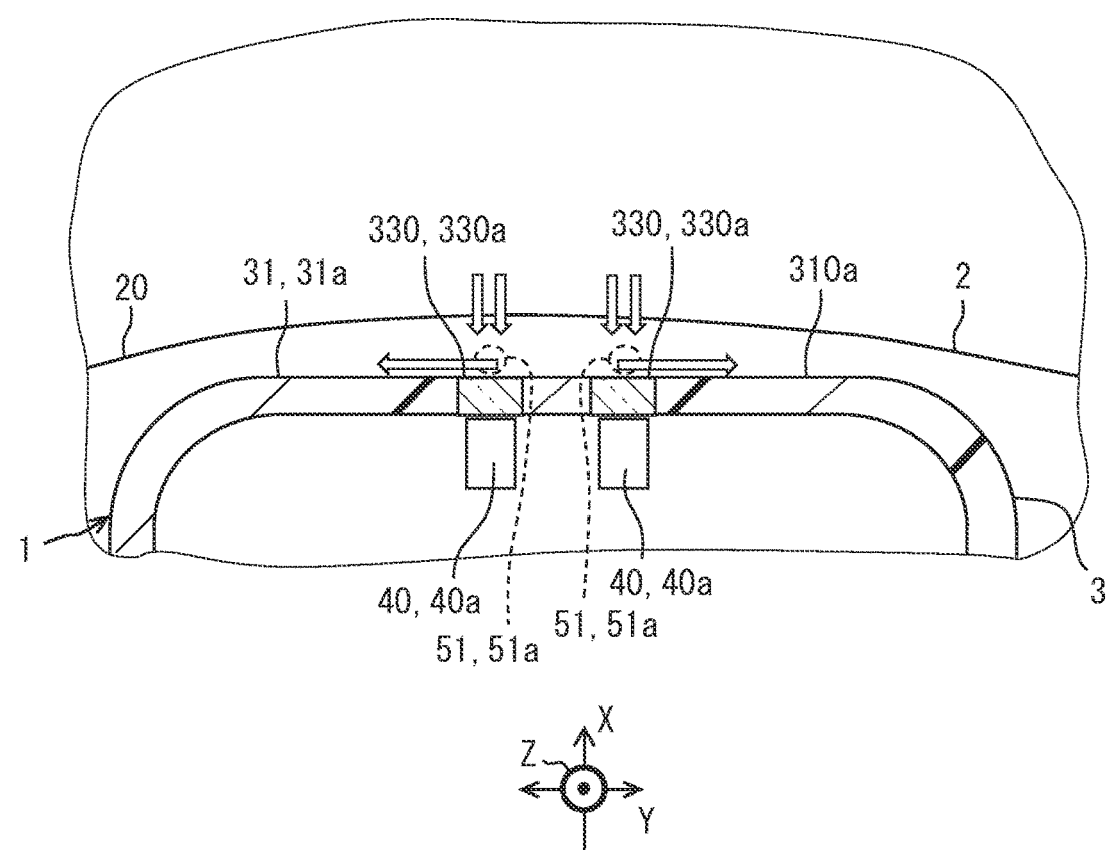
FIG. 7 is a horizontal cross-sectional view for explaining effects of the sensor unit according to the first embodiment.

According to the housing 3 of the first embodiment, the vertical wall surface 310a is formed on the side of the exposed surface 330a in the pitch axis direction Y of the vehicle 2 and is exposed forward in the travel direction X. In addition, the exposed surface 330a itself takes a shape that spreads laterally along the pitch axis direction Y. According to the above, as indicated by the white arrow in FIG. 7, the travel wind that collides with the exposed surface 330a and partially moves sideways can be suppressed from being disturbed by the vertical wall surface 310a. Therefore, the flow of the cleaning fluid on the exposed surface 330a is less likely to be hindered, and the cleaning performance is stabilized.

Second Embodiment

Figure 8:
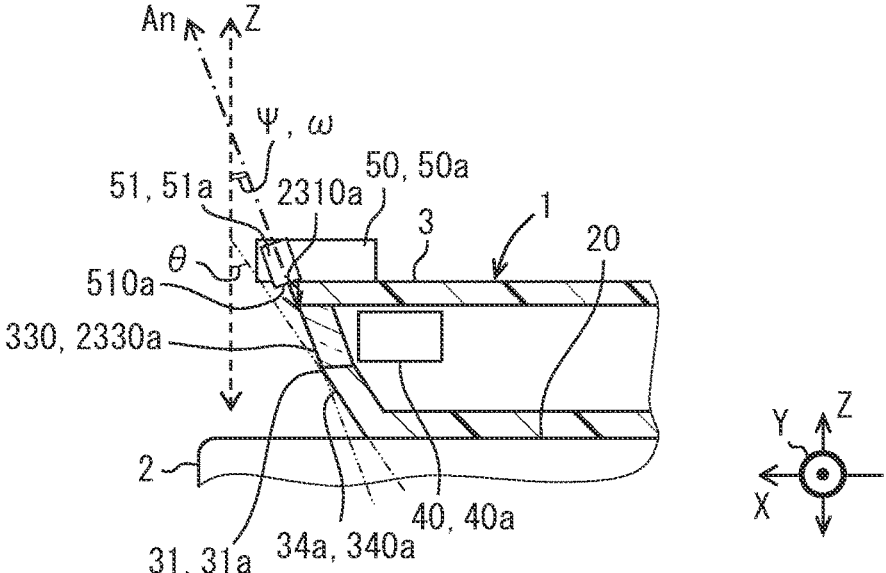
FIG. 8 is a vertical cross-sectional view showing a detailed structure of a sensor unit according to a second embodiment, corresponding to FIG. 5.

A second embodiment of the present disclosure will be described with reference to FIG. 8. The second embodiment shown in FIG. 8 is a modification example of the first embodiment.

In the second embodiment, exposed surfaces 2330*a* respectively corresponding to the front external sensors 40*a* are inclined rearward in the travel direction X as toward downward in the yaw axis direction Z. In the second embodiment, vertical wall surfaces 2310*a* adjacent to two sides of each of the exposed surfaces 2330*a* in the pitch axis direction Y and to the upper side in the yaw axis direction Z are also inclined to the rearward in the travel direction X as toward downward in the yaw axis direction Z. Both the exposed surface 2330*a* and the vertical wall surface 2310*a* are formed on the surface inclined at a predetermined angle with respect to the travel direction X and the yaw axis direction Z, so that they extend substantially parallel in the pitch axis direction Y to have an inclined planar shape.

In the second embodiment as described above, the angle $\theta$ formed by the inclined planar recessed surface 340*a* with respect to the yaw axis direction Z to the rearward of the travel direction X is set in a range of an acute angle that is larger than the angle $\psi$ that is formed rearward in the travel direction X by the exposed surfaces 2330*a* inclined with respect to the yaw axis direction Z and the vertical wall surface 2310*a*. In addition, in the second embodiment, the angle $\psi$ formed by each of the inclined planar exposed surfaces 2330*a* and the vertical wall surface 2310*a* with respect to the yaw axis direction Z to the rearward of the travel direction X, and the angle $\omega$ formed by the injection axis direction An of each of the cleaning nozzles 51*a* with respect to the rearward of the travel direction X are set to be substantially the same angle. As a result, the angle $\theta$ formed by the inclined planar recessed surface 340*a* with respect to the yaw axis direction Z to the rearward of the travel direction X is also set to be within an acute angle range, which is greater than the angle $\omega$ formed by the injection axis direction An of the injection port 510*a* of each of the cleaning nozzles 51*a* with respect to the yaw axis direction Z to the rearward of the travel direction X.

The operation and effects of the second embodiment will be described.

According to the second embodiment, because the exposed surface 2330*a* is inclined rearward in the travel direction X as toward downward in the yaw axis direction Z, the cleaning fluid is smoothly guidable downward and rearward to the recess 34*a* together with the travel wind. Therefore, it is possible to improve the stability of the cleaning performance.

According to the second embodiment, the angle $\theta$ formed by the inclined planar recessed surface 340*a* with respect to the yaw axis direction Z is greater than the angle $\psi$ formed by the inclined planar exposed surface 2330*a* with respect to the yaw axis direction Z. According to the above, the cleaning fluid, guided downward and rearward together with the travel wind on the inclined planar exposed surface 2330*a*, easily flows into the recess 34*a*, and is suppressed from having a vortex by being guided along the inclined planar recessed surface 340*a* that is inclined rearward from the exposed surface 2330*a*. Therefore, it is possible to improve the stability of the cleaning performance.

According to the second embodiment, the flow of the cleaning fluid injected from the cleaning nozzle 51*a*, whose injection axis direction An inclined rearward in the travel direction X as going further downward in the yaw axis direction Z, is less likely to be disturbed when flowing downward into the recess 34 on the similarly inclined exposed surface 2330*a*. In particular, on the exposed surface 2330*a* where the angle formed with the yaw axis direction Z is $\psi$ which is substantially the same as w in case of having the injection axis direction An, the vortex of the cleaning fluid is more easily suppressible. Therefore, it is possible to improve the stability of the cleaning performance.

Other Embodiments

Although multiple embodiments have been described above, the present disclosure is not construed as being limited to those embodiments, and can be applied to various embodiments and combinations within a scope that does not depart from the spirit of the present disclosure.

The structure of the first and second embodiments may be suitably modified. For example, the recess 34*a* may be formed by a plurality of planar recessed surfaces instead of the single inclined planar recessed surface 340*a*. For example, the recess 34*a* may be formed by the two recessed surfaces, i.e., by a first recessed surface that forms a right angle substantially parallel to the yaw axis direction Z or an acute angle inclined to the rearward of the travel direction X with respect to the yaw axis direction Z, and a second recessed surface that is substantially parallel to the yaw axis direction Z or that forms an acute angle to the rearward of the travel direction X with respect to the yaw axis direction Z. In the modifications of the first and second embodiments, although the exposed surfaces 330*a*, 2330*a* and the vertical wall surfaces 310*a*, 2310*a* may extend at least along the pitch axis direction Y, they may respectively have a step shape connection, e.g., the exposed surfaces 330*a*, 2330*a* shifted either forward or rearward in the travel direction X, from the vertical wall surfaces 310*a*, 2310*a*. In the modifications of the first and second embodiments, as long as the recess 34*a* is arranged below the exposed surfaces 330*a* and 2330*a* in the yaw axis direction Z to suppress the vortex, vertical wall surfaces 310*a* and 2310*a* may be provided at a position between the exposed surfaces 330*a* and 2330*a* and the recess 34*a*.

Figure 9:
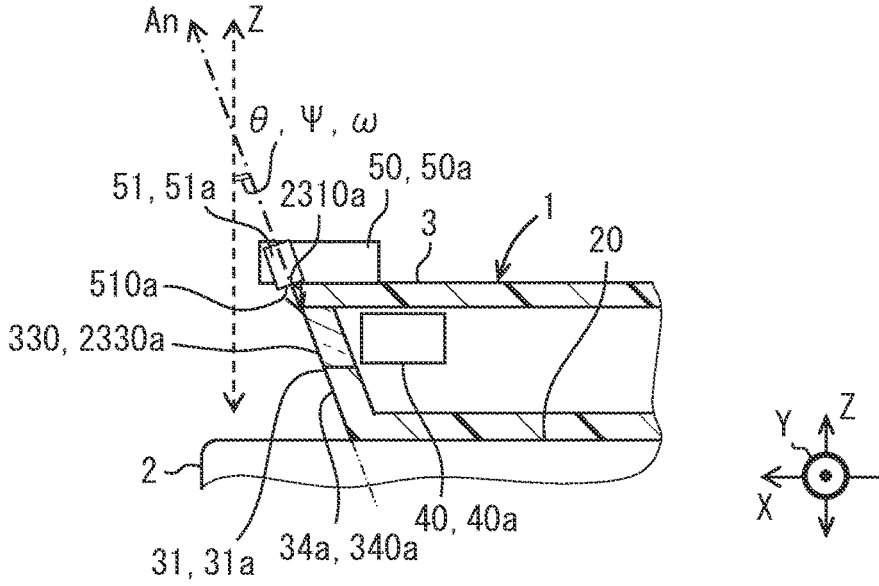
FIG. 9 is a vertical cross-sectional view showing a detailed structure of the sensor unit according to a modification of the second embodiment, corresponding to FIG. 8.

As shown in FIG. 9, in the second embodiment, the angle $\theta$ formed by the recessed surface 340*a* with respect to the yaw axis direction Z to the rearward of the travel direction X may be set to substantially the same angle as which is an angle formed by the exposed surface 2330*a* with respect to the yaw axis direction Z to the rearward of the travel direction X, or may be set to an acute angle range that is smaller than the angle $\psi$. Alternatively, as shown in FIG. 9, the angle $\theta$ formed by the recessed surface 340*a* with respect to the yaw axis direction Z to the rearward of the travel direction X may be set to substantially the same angle $\omega$, which is an angle formed by the injection axis direction An with respect to the yaw axis direction Z to the rearward of the travel direction X, or may be set to an acute angle range that is smaller than the angle $\omega$. Alternatively, in the modification of the second embodiment, the angle $\theta$ formed by the recessed surface 340*a* with respect to the yaw axis direction Z to the rearward of the travel direction X may be set to an acute angle range that may be greater or smaller than the angle $\omega$ formed by the injection axis direction An of each of the cleaning nozzles 51*a* with respect to the yaw axis direction Z to the rearward of the travel direction X.

In the first and second embodiments, the recessed surface 340*a* may be formed to be inclined more rearward in the travel direction X as toward downward in the yaw axis direction Z, with the change rate in the travel direction X increased or decreased as toward downward. In a modification of the second embodiment, the exposed surface 2330*a* may be formed to be inclined more rearward in the travel direction X as toward downward in the yaw axis direction Z, in accordance with the change rate in the travel direction X increased or decreased.

As in the modifications of the first and second embodiments, the transparent cover 33 forming the exposed surfaces 330, 330a, 2330a may be provided on the external sensors 40, 40a themselves. For example, the exposed surfaces 330, 330a, 2330a may be formed by optical members such as lenses in the eternal sensors 40, 40a.

What is claimed is:

1. A sensor unit for a vehicle, comprising:
an external sensor configured to obtain information of an external environment, and to have a sensing area being set forward in a travel direction of the vehicle through an exposed surface exposed to the external environment;
a cleaning nozzle having an injection port that is located in front of the exposed surface to inject a cleaning fluid to the exposed surface from above of the exposed surface in a yaw axis direction of the vehicle to clean the exposed surface; and
a housing holding the external sensor therein, the housing being configured to define a recess that is recessed toward a rearward in the travel direction from the exposed surface below the exposed surface in the yaw axis direction, wherein
the recess is provided with a recessed surface that is inclined more rearward in the travel direction from the exposed surface as toward downward in the yaw axis direction,
the exposed surface is inclined more rearward in the travel direction as toward downward in the yaw axis direction, the recessed surface extending from a lower end of the exposed surface, and
an inclination angle of the recessed surface inclined with respect to the yaw axis direction is greater than an inclination angle of the exposed surface inclined with respect to the yaw axis direction.

2. The sensor unit according to claim 1, wherein
an injection axis direction of the cleaning nozzle is inclined more rearward as toward downward in the yaw axis direction.

3. The sensor unit according to claim 1, wherein
the cleaning fluid is a cleaning gas.

4. The sensor unit according to claim 1, wherein
the sensing area in an automatic driving control mode of the vehicle is set forward through the exposed surface.

5. The sensor unit according to claim 1, wherein
the housing has a vertical wall surface exposed forward in the travel direction at a side of the exposed surface in a pitch axis direction of the vehicle, and
the exposed surface and the vertical wall surface are configured to have a shape extending along the pitch axis direction.

6. The sensor unit according to claim 1, wherein
an injection axis direction of the cleaning nozzle is inclined increasingly rearward relative to the yaw axis direction, and
an inclination angle of the injection axis direction of the cleaning nozzle with respect to the yaw axis direction is substantially equal to the inclination angle of the exposed surface inclined with respect to the yaw axis direction.

7. The sensor unit according to claim 1, wherein
an injection axis direction of the cleaning nozzle is inclined rearward in the travel direction as the injection axis direction moves downward in the yaw axis direction, and
the inclination angle of the recessed surface inclined with respect to the yaw axis direction is greater than an inclination angle of the injection axis direction of the cleaning nozzle with respect to the yaw axis direction.

8. The sensor unit according to claim 1, wherein
the exposed surface and the recessed surface are planar.

9. A sensor unit for a vehicle, comprising:
an external sensor configured to obtain information of an external environment, and to have a sensing area of the vehicle through an exposed surface exposed to the external environment;
a cleaning nozzle having an injection port that is located to inject a cleaning fluid to the exposed surface from above of the exposed surface in a yaw axis direction of the vehicle to clean the exposed surface; and
a housing configured to hold the external sensor therein and having a wall portion positioned at an outside, wherein
the housing is provided with the exposed surface and an inclination wall surface extending from a lower end of the exposed surface below the exposed surface,
the exposed surface and the inclination wall surface are provided as a part of the wall portion of the housing,
the inclination wall surface and the exposed surface are respectively inclined with respect to the yaw axis direction to be positioned more inside as toward downward in the yaw axis direction, and
an inclination angle of the inclination wall surface inclined with respect to the yaw axis direction is greater than an inclination angle of the exposed surface inclined with respect to the yaw axis direction.

10. The sensor unit according to claim 9, wherein
an injection axis direction of the cleaning nozzle is inclined increasingly inward relative to the yaw axis direction, and
an inclination angle of the injection axis direction of the cleaning nozzle with respect to the yaw axis direction is substantially equal to the inclination angle of the exposed surface inclined with respect to the yaw axis direction.

11. The sensor unit according to claim 9, wherein
an injection axis direction of the cleaning nozzle is inclined inward as the injection axis direction moves downward in the yaw axis direction, and
the inclination angle of the inclination wall surface inclined with respect to the yaw axis direction is greater than an inclination angle of the injection axis direction of the cleaning nozzle with respect to the yaw axis direction.

12. The sensor unit according to claim 9, wherein
the exposed surface and the inclination wall surface are planar.

* * * * *